July 7, 1964     R. W. ROOP     3,139,688
EDUCATIONAL APPARATUS
Filed June 9, 1961
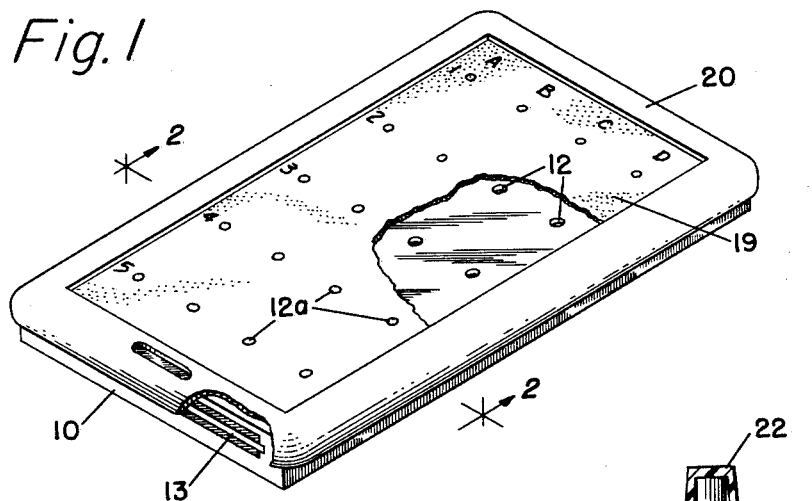
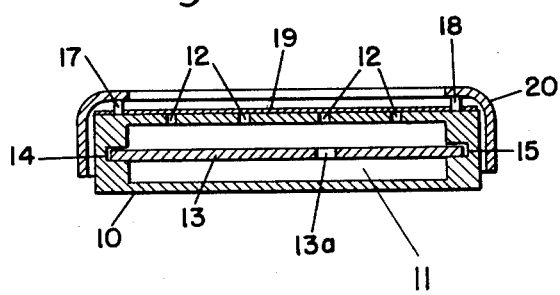
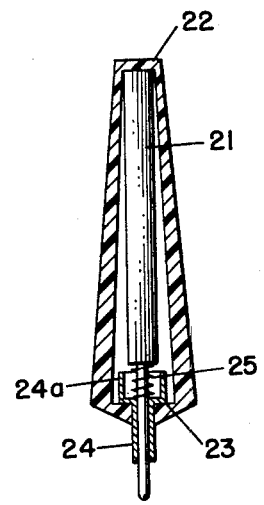
INVENTOR.
ROBERT W. ROOP
BY Alfred Stapley
ATTORNEY ably open at one narrow end. Apertures 12 provide communication between the top surface of block 10 and cavity 11. These apertures are arranged in some predetermined pattern, such as, for example, that represented by circles 12a in FIGURE 1 and consist of five rows (numbered 1 through 5 in FIGURE 1) and four columns (lettered A through D in FIGURE 1). This pattern of apertures corresponds to the possible answers to multiple choice questions which may be presented to the subject being tested in any suitable manner, such as in writing on a questionnaire form separate from the apparatus of FIGURES 1 and 2. The specific pattern of apertures in FIGURE 1 is particularly suitable for a test consisting of up to five questions, each having a maximum of four possible multiple choice answers. It will be understood that, by utilizing the proper number and arrangement of apertures, provisions may be made for other numbers of questions, with other numbers of possible multiple choice answers.

United States Patent Office 3,139,688
Patented July 7, 1964

3,139,688
EDUCATIONAL APPARATUS
Robert W. Roop, Sewell, N.J., assignor to General Atronics Corporation, Bala-Cynwyd, Pa., a corporation of Pennsylvania
Filed June 9, 1961, Ser. No. 121,291
12 Claims. (Cl. 35—9)

This invention relates to new and improved educational testing apparatus and more particularly to such apparatus which produces in an individual being tested distinguishably different sensations in response to correct and incorrect answers to test questions.

It is known to use, for educational testing purposes, apparatus comprising blocks, or boards provided with apertures indexed to represent the possible answers to multiple choice questions. This known apparatus also comprises a probe for insertion into whichever apertures the individual being tested regards as representing correct answers. Provisions are made in such apparatus for distinguishing between probe insertion in apertures which in fact represent correct answers and probe insertion in apertures which represent incorrect answers. Thus the individual being tested is immediately informed of the correctness of his answers, with beneficial results on his retention of correct answers.

Various means have been proposed for distinguishing between the different apertures. Some of these produced different electrical indications depending upon the correctness or incorrectness of the answer, others involved the use of apertures of different depths and still others involved the use of apparatus for giving the user different sensations of resiliency.

Some of these prior means, notably those productive of electrical indications, were unduly complicated, others provided insufficient distinction between correct and incorrect answers, and still others suffered from a combination of these shortcomings.

Accordingly, it is a primary object of the present invention to provide educational testing apparatus of the type under consideration, but having improved means for producing in response to insertion of a probe in apertures indexed to represent correct answers to test questions distinctively different indications than in response to insertion of said probe in apertures representing incorrect answers.

It is another object of the invention to provide such means which do not rely on electricity for their operation.

To achieve the foregoing objects, as well as others which will appear, testing apparatus of the type under consideration is provided with means for limiting the depth to which the probe can be inserted into each answer representative aperture. These limiting means are of such construction as to produce substantially the same sensation of resiliency upon insertion of the probe to the limit in any aperture. Moreover these limiting means are so constructed as to produce a substantial force tending to reduce the penetration of the probe into some of said apertures, but not into others.

For further details reference is made to the discussion which follows and to the accompanying drawings wherein FIGURE 1 is a perspective view of an aperture-containing apparatus forming part of an embodiment of the invention;

FIGURE 2 is a sectional view taken in the plane defined by arrows 2—2 in FIGURE 1; and FIGURE 3 is a view, partly in section, of a probe for use with the apparatus of FIGURES 1 and 2.

In each of FIGURES 1 and 2, to which reference may now be had, the reference numeral 10 designates a block of some solid material, such as wood, metal or plastic, having in its interior a hollow cavity 11 which is preferably A panel 13 is slidably insertable into cavity 11 along tracks formed by longitudinal slots 14 and 15 in opposing interior side walls of the cavity. This panel 13 is coded to distinguish between the correct and incorrect ones of the possible answers represented by apertures 12. Code panel 13 may be of some solid material, such as metal, the required coding being provided by apertures in this panel arranged in such a pattern as to line up, upon complete insertion of panel 13 in cavity 11, with all those apertures 12 in block 10 which represent correct answers to the various multiple choice questions.

For purposes of illustration it has been assumed in FIGURES 1 and 2 that aperture C in row 4 corresponds to the correct answer to question 4. A hole 13a is therefore provided in panel 13 (see FIGURE 2) in line with aperture C, row 4 in block 10. No holes are provided in panel 13 in positions aligned with other apertures in row 4 of block 10.

Preferably block 10 is also provided with a plurality of upwardly extending locating pins, two of which are shown in FIGURE 2 identified by reference numerals 17 and 18. These pins are designed to engage correspondingly positioned locating apertures in a sheet of paper 19 of sufficient size to cover the top surface of block 10. This sheet 19 is preferably imprinted with a pattern of circles in locations corresponding to those designated by reference numeral 12a in FIGURE 1. As previously explained, these circles denoted the locations of apertures 12 in block 10. Accordingly the circles on sheet 19 identify the locations of said apertures 12. As shown in FIGURE 1, these circles may be readily identified by means of printed numerals (1 through 5) and letters (A through D) with the various possible answers to the multiple choice questions constituting the test. A cover plate 20, having a central portion cut out to expose the printing on sheet 19, covers both that sheet and block 10, and prevents insertion and/or withdrawal of either code panel 13 or sheet 19 without prior removal of the cover plate. This cover plate may be locked to block 10 in any suitable manner to prevent its removal in unauthorized manner.

The probe for use with the apparatus of FIGURES 1 and 2 is shown in FIGURE 3, to which reference may now be had. This probe comprises a rigid cylinder 21, thinner at one end than at the other. Cylinders of this shape are frequently used as the ink reservoir in ball point pens, in which case the thin end of the cylinder terminates in a ball point. Such a reservoir is suitable for use as cylinder 21 in accordance with the present invention.

Cylinder 21 is contained in a cylindrical housing 22 which is closed at the end nearest the thick end of cylinder 21 and open at the other end. An internal annular shoulder 23 restricts the open end of housing 22, which is sufficiently shorter than cylinder 21 that a substantial portion of the thin end of said cylinder protrudes from the open end of housing 22 even when the thick end of the cylinder abuts against the closed end of the housing. Also protruding from housing 22 through its open end is a portion of a cylindrical sleeve 24 which surrounds concentrically the protruding thin end of cylinder 21. Sleeve 24 has a portion 24a whose diameter (both internal and external) is greater than that of its protruding portion. The shoulder formed where the wide portion 24a of sleeve 24 meets the thin portion of said sleeve abuts against shoulder 23 of housing 22 and is prevented by said shoulder 23 from passing through the open end of housing 22. A helical spring 25 surrounds concentrically the thin portion of cylinder 21. One end of this spring is recessed within wide portion 24a of sleeve 24, while the other end abuts against the shoulder formed where cylinder 21 changes thickness. Spring 25 is so proportioned as to be in compression at all times. Consequently, this spring urges sleeve 24 outwardly through the opening in housing 22 while urging cylinder 21 toward the closed end of housing 22.

The dimensions of the probe components are such that the protruding end of cylinder 21 extends beyond the maximum protrusion of sleeve 24 by an amount at least equal to, and preferably slightly greater than the spacing between the top surface of block 10 and the top surface of code panel 13 in FIGURES 1 and 2. Moreover the diameter of the thin end of cylinder 21 is less than the diameter of any one of apertures 12 in block 10, while the external diameter of the protruding end of sleeve 24 is greater than said aperture diameter.

The apparatus of FIGURES 1 to 3 is used as follows. Holding the probe shown in FIGURE 3 by its housing 22 the individual using the apparatus pierces sheet 19 of FIGURES 1 and 2 with the pointed protruding end of cylinder 21 at a location corresponding to the particular answer to a question which he regards as correct. Thereafter he continues to bring pressure on housing 22 in a direction perpendicular to the surface of sheet 19, thereby causing the pointed end of cylinder 21 to penetrate into the aperture in block 10 beneath the location at which sheet 19 has been pierced. If the aperture thus penetrated is not aligned with a hole in code panel 13, then the penetration of the end of cylinder 21 will be arrested by abutment against the code panel before the end of sleeve 24, which protrudes from housing 22, has been brought to bear against the top surface of block 10. Under these circumstances the individual operating the probe will experience a firm resistance to further penetration of the probe, but no force tending to push it back out of the aperture in block 10 in which it is inserted.

On the other hand, if the aperture in block 10 penetrated by the probe is aligned with an aperture in code panel 13, then the pointed end of cylinder 21 will pass through that aperture and, in response to continued pressure on housing 22, will penetrate into the portion of cavity 11 below said code panel. As a result sleeve 24 will be brought to bear against the top surface of block 10 and will gradually retract into housing 22 until spring 15 is fully compressed. At that point further penetration of cylinder 21 becomes impossible since that cylinder is, in effect, solidly coupled to sleeve 24, whose protruding end abuts firmly against the top surface of block 10. Under these circumstances the individual operating the probe will again experience firm resistance to further penetration of the probe, but, in addition, he will experience a force, caused by the pressure of spring 25 on sleeve 24, tending to push the probe back out of the aperture in block 10 in which it is inserted.

It has been found that the sensation thus produced in response to probe insertion in apertures representing correct answers (i.e. in apertures in block 10 aligned with holes in code panel 13) contrasts very conspicuously with that produced in response to insertion in apertures representing incorrect answers (i.e. in apertures in block 10 not aligned with holes in code panel 13). The existence of this conspicuous contrast stimulates greatly the retention of the correct answers by the individual taking the test.

The presence of paper sheet 19 (FIGURES 1 and 2) serves the multiple purposes of (1) concealing the arrangement of apertures in code panel 13 from possible investigation by the individual taking the test, (2) providing, in the perforations made in the course of reaching the apertures in block 10, a record of the number of attempts at answering the test questions, and (3) providing space for recording the test questions and answers, which may be placed on sheet 19 either in the appropriate spaces between aperture-locating circles 12a, or on suitable extensions of sheet 19 beyond the boundaries shown in FIGURES 1 and 2.

It will be understood that numerous variations of the apparatus described herein are possible without departing from my inventive concept, and accordingly I desire the scope of said concept to be limited only by the appended claims.

I claim:

1. Educational apparatus comprising: a block having an internal cavity and a plurality of apertures leading into said cavity; a code panel pierced by holes in such a pattern as to align with only some of said apertures upon insertion of said panel in said cavity; and a probe insertable into said cavity through any one of said apertures, said probe comprising means for firmly limiting its maximum penetration into any aperture having no hole aligned therewith and means for producing a force tending to reduce said penetration upon maximum penetration only into said apertures aligned with said holes.

2. The apparatus of claim 1 characterized in that said force producing means comprises means displaceable in response to penetration of said probe into any aperture in said block beyond the depth of said inserted code panel by an amount which increases with increasing penetration beyond said depth.

3. The apparatus of claim 2 characterized in that said displaceable means is retractable into the interior of said probe.

4. The apparatus of claim 2 further characterized by the provision of means for opposing said displacement with a force which increases with increases in the amount of said displacement.

5. The apparatus of claim 4 characterized in that said probe comprises means for firmly limiting the maximum displacement of said displaceable means.

6. The apparatus of claim 5 characterized in that said displacement opposing force is exerted in a direction colinear with the direction of penetration of said probe into said apertures.

7. Educational apparatus comprising a surface having a plurality of apertures; a probe insertable into any of said apertures; means spaced from said surface for limiting insertion of said probe into some of said apertures to a shallow depth and into others of said apertures to a greater depth; and means associated with said probe and yieldingly resisting insertion of said probe into said other apertures beyond said shallow depth.

8. The apparatus of claim 7 characterized in that said probe comprises a pin protruding from one end of a housing concentrically surrounding said pin and unyieldingly restrained from retraction into said housing.

9. The apparatus of claim 8 further characterized in that said means associated with said probe comprises a sleeve protruding from said one end of said housing and also concentrically surrounding said pin, said sleeve being urged to protrude from said housing by a spring concentrically surrounding said pin within said housing.

10. The apparatus of claim 9 further characterized in that said housing and sleeve comprise means for preventing said sleeve from protruding from said housing beyond a predetermined maximum distance.

11. The apparatus of claim 10 further characterized in that said pin protrudes beyond the maximum protrusion of said sleeve by an amount at least equal to said shallow depth.

12. A probe comprising a generally cylindrical hollow handle open at one end, a pin protruding from said open end, means within said handle unyieldingly preventing said pin from retracting into said handle through said open end, a sleeve concentrically surrounding said pin and partially protruding from said open end of said handle, a compressed coil spring concentrically surrounding said pin within said handle and abutting at one end on a shoulder on said pin and at the other on a shoulder on said sleeve, thereby urging said pin into and sleeve out of said handle through said open end, and a shoulder on said handle surrounding said open end and engageable by said shoulder on said sleeve to prevent said sleeve from protruding beyond said open end by more than a predetermined fraction of the length of said sleeve.

References Cited in the file of this patent

UNITED STATES PATENTS

| | | |
|---|---|---|
| 1,644,160 | Thompson | Oct. 4, 1927 |
| 2,062,144 | Perry | Nov. 24, 1936 |
| 2,267,700 | Lee | Dec. 23, 1941 |
| 2,311,055 | Kopas | Feb. 16, 1943 |
| 2,889,634 | Bringmann | June 9, 1959 |
| 2,943,400 | Griswold | July 5, 1960 |